United States Patent [19]
Chaudhary

[11] Patent Number: 5,710,186
[45] Date of Patent: Jan. 20, 1998

[54] FOAMS CONTAINING TREATED TITANIUM DIOXIDE AND PROCESSES FOR MAKING

[75] Inventor: Bharat I. Chaudhary, Westerville, Ohio

[73] Assignee: The Dow Chemical Company, Midland, Mich.

[21] Appl. No.: 736,024

[22] Filed: Oct. 23, 1996

Related U.S. Application Data

[63] Continuation of Ser. No. 656,653, May 31, 1996.

[51] Int. Cl.$^6$ ............................ C08J 9/18; C08G 18/00
[52] U.S. Cl. ............................ 521/60; 521/79; 521/85; 521/92; 521/97; 521/125; 521/129; 521/143; 521/146
[58] Field of Search ........................ 521/60, 79, 85, 521/92, 97, 125, 129, 143, 146

[56] References Cited

U.S. PATENT DOCUMENTS

| | | | |
|---|---|---|---|
| 5,149,722 | 9/1992 | Soukup | 521/99 |
| 5,192,607 | 3/1993 | Soukup | 521/99 |
| 5,397,807 | 3/1995 | Hitchcock et al. | 521/99 |

FOREIGN PATENT DOCUMENTS

| | | | |
|---|---|---|---|
| 63183941 | 7/1988 | Japan | C08J 9/04 |

*Primary Examiner*—Morton Foelak
*Attorney, Agent, or Firm*—J. Robert Dean, Jr.

[57] ABSTRACT

Disclosed is a closed-cell polymer foam comprising a quantity of titanium dioxidce particulates sufficient to reduce the thermal conductivity of the foam to less than that of a corresponding foam without the titanium dioxide particulates. The titanium dioxide particulates have a wetting aggent applied to a substantial portion of their surfaces. Further disclosed are processes for making the foams.

24 Claims, No Drawings

FOAMS CONTAINING TREATED TITANIUM DIOXIDE AND PROCESSES FOR MAKING

This is a continuation of application Ser. No. 08/656,653, filed May 31, 1996.

BACKGROUND OF THE INVENTION

This invention relates to polymer foams containing treated titanium dioxide particulates and a process for making the foam.

To improve the insulating performance of polymer foams, various types of infrared attenuating agents (IAA) have been employed. The IAA may absorb, reflect, and/or scatter infrared radiation. Examples of IAA include carbon black, graphite, titanium dioxide, mica, and metal flakes such as those of aluminum. IAAs are incorporated into polymer foams in particulate or flake form.

A problem in incorporating IAAs in foams is the processing difficulties they present during the foaming process as well as in the foam product itself. In both thermoplastic extrusion and thermoset foaming processes, it is difficult to achieve adequate wetting and dispersion of the IAAs. The IAAs typically have a much greater affinity for themselves than for thermoplastic melts or thermoset reactive components in which they are admixed; thus, they exhibit a tendency to form aggregates or agglomerates. Inadequate IAA wetting and dispersion during processing manifests itself in the foam product in the form of large open cell content and reduced insulating capability due to loss of blowing agent.

The prior art describes methods of enhancing dispersion of one type of an IAA, carbon black, in thermoset and thermoplastic foaming processes. U.S. Pat. Nos. 5,149,722; 5,137,190; and 5,192,607 relate the addition of a capped polyoxyalkylene compound to one or more of the thermoset reactive components to enhance dispersion of the carbon black. A disadvantage of this method is that roughly large amounts of the polyoxyalkylene compound must often be employed to achieve a desirable degree of dispersion of the carbon black. Large amounts are expensive, and may impact critical physical properties of the product foam. U.S. Pat. No. 5,397,807 relates treating the carbon black with a compatibilizing agent such as dibutylphthalate prior to incorporation into a thermoplastic melt or a thermoset reactive component to enhance dispersion of the carbon black. The method taught in U.S. Pat. Nos. 5,397,807 offers an advantage over those taught in U.S. Pat. Nos. 5,149,722; 5,137,190; and 5,192,607 because the amount of the agent employed may be reduced; thus, negative impact on foam physical properties may be reduced.

A problem with employing carbon black as an IAA is that it is porous and tends to absorb substantial quantities of any material which may be applied to it to enhance wetting and dispersion. Substantial quantities may be absorbed before the surface characteristics of the IAA are modified to a degree sufficient to provide adequate wetting. During foam manufacture, excessive amounts of the material applied to the IAA may leach out into the thermoplastic melt or thermoset reactive components and negatively impact end product foam physical properties.

It would be desirable to obtain a thermoplastic or thermoset foam containing an IAA to improve insulating capability. It would be further desirable to obtain a high degree of wetting and dispersion of the IAA such that there is low open cell content. It would be further desirable to employ an IAA wherein the amount of material applied to the IAA to enhance wetting and dispersion could be further reduced to further decrease the impact of leaching the material on foam physical properties.

BRIEF SUMMARY OF THE INVENTION

According to the present invention, there is a polymer foam comprising a quantity of treated titanium dioxide particulates sufficient to reduce the thermal conductivity of the foam to less than that of a corresponding foam without the titanium dioxide particulates. A useful foam is an extruded alkenyl aromatic polymer foam comprising greater than 50 percent by weight of alkenyl aromatic monomeric units. The particulates are treated over a substantial portion of their surfaces to reduce the incidence of agglomeration prior to formation of the foam and improve wetting during foam processing.

According to the present invention, there is a process for making extruded thermoplastic polymer foam. The process comprises: heating a thermoplastic polymer material to form a melt polymer material; incorporating into the melt polymer material treated titanium dioxide particulates; further incorporating into the melt polymer material at an elevated pressure a blowing agent to form a foamable gel; cooling the foamable gel to an optimum foaming temperature; and extruding the cooled foamable gel through a die to a region of lower pressure to form a foam. The titanium dioxide particulates are incorporated in an amount sufficient to reduce the thermal conductivity of the foam to less than that of a corresponding foam without the particulates. The particulates are treated over a substantial portion of their surfaces prior to incorporation into the melt polymer material to reduce the incidence of agglomeration prior to formation of the foam and improve wetting during foam processing.

Further according to the present invention, there is a process for making a thermoset polymer foam. The process comprises: providing a first thermoset monomer; providing a second thermoset monomer the same or different than the first monomer and polymerizable with the first monomer; incorporating into either or both the first and second monomers treated titanium dioxide particulates; incorporating into either or both the first and second monomers a blowing agent; and mixing the first and second monomers under polymerizing conditions to form the thermoset polymer foam. The titanium dioxide particulates are incorporated in an amount sufficient to reduce the thermal conductivity of the foam to less than that of a corresponding foam without the particulates. The particulates are treated over a substantial portion of their surfaces prior to incorporation into the first and/or second monomers to reduce the incidence of agglomeration prior to formation of the foam and improve wetting during foam processing.

Further according to the present invention, there is a process for making expandable thermoplastic foam beads. The process comprises: providing a first thermoplastic monomer; providing a second thermoplastic monomer the same or different than the first monomer and polymerizable with the first monomer; polymerizing the first and second monomers to form thermoplastic particles; incorporating during polymerization treated titanium dioxide particulates; incorporating a blowing agent into the thermoplastic particles during or after polymerization; and cooling the thermoplastic particles to form the expandable foam beads. The titanium dioxide particulates are incorporated in an amount sufficient to reduce the thermal conductivity of the foam to less than that of a corresponding foam without the particulates. The particulates are treated over a substantial portion of their surfaces prior to incorporation into the melt polymer material to reduce the incidence of agglomeration prior to formation of the foam and improve wetting during foam processing.

Further according to the present invention, there is a process for making expandable thermoplastic foam beads. The process comprises: heating a thermoplastic polymer material to form a melt polymer material; incorporating into the melt polymer material treated titanium dioxide particulates; further incorporating into the melt polymer material at an elevated temperature a blowing agent to form a foamable gel; cooling the foamable gel to form an essentially continuous expandable thermoplastic strand; and pelletizing the expandable thermoplastic strand to form expandable thermoplastic foam beads. The titanium dioxide particulates are incorporated in an amount sufficient to reduce the thermal conductivity of the foam to less than that of a corresponding foam without the particulates. The particulates are treated over a substantial portion of their surfaces prior to incorporation into the melt polymer material to reduce the incidence of agglomeration prior to formation of the foam and improve wetting during foam processing.

DETAILED DESCRIPTION

It was found surprising the amount of wetting agent needed to effectively prevent or diminish agglomeration of an IAA before and during foam manufacture could be substantially reduced with proper selection of the IAA. Titanium dioxide particulates were found to require substantially less wetting agent than the carbon black of the prior art. Thus, only relatively small quantities of the wetting agent are required.

Titanium dioxide particulates useful in the present invention are surface treated with organic materials or both inorganic and organic materials to reduce or prevent agglomeration. Virgin particulates can be treated by wet processing methods such as precipitation with inorganic materials such as hydrous oxides of aluminum, silicon, or zinc to form a surface residue to reduce surface energy and/or provide an inerting barrier as described in U.S. Pat. Nos. 5,340,393; 2,885,366; 4,737,194 and Re. 27,818 and EPO Publication Nos. 693096 and 245984, which are incorporated herein by reference. Low levels of the organic wetting agent are applied to the surfaces of the particulates to enhance wettability and dispersability. The amount of the wetting agent typically ranges from 0.05 percent to 2.0 percent and preferably from 0.1 percent to 1.0 percent based upon the weight of the titanium dioxide.

Suitable wetting agents include but are not limited to fatty acids, ethoxylated fatty acids, fatty acids esters of 8–24 carbon atoms, phthallic esters of 8–24 carbon atoms, sorbitan esters, monoglycerides, mineral oils, silicon oils, polyalkylene glycols such as polyethylene glycol and polypropylene glycol, and mixtures of the above. Additional useful wetting agents include phosphorylated polyenes of polyunsaturated olefins, fatty acid esters, and fatty acid amides of a chain length of 10 carbons or more as disclosed in U.S. Pat. No. 4,209,430, which is incorporated herein by reference. Additional useful wetting agents include the organic compounds disclosed in U.S. Pat. No. 4,999,055 and EPO Publication No. 693096, which are incorporated herein by reference. Additional useful wetting agents include esters of difunctional $C_6$–$C_{40}$ aliphatic and aromatic carboxylic acids and triesters of phosphoric acid as described in PCT Publication No. WO 94/22962, which is incorporated herein by reference.

Any means of applying the wetting agent to the titanium dioxide may be employed such as by mixing, agitation, and spraying. The wetting agent may be applied with a solvent, thinner, or other liquid vehicle to ensure proper application to the surfaces of the titanium dioxide particulates. Suitable solvents or thinnets include water or volatile organic compounds.

Titanium dioxide particulates useful in the present invention have an average particle size typically ranging from about 0.1 to about 3.0 micrometers and preferably about 0.2 to about 1.5 micrometers. Useful crystal forms of titanium dioxide include rutile and anatase. The rutile form is preferred because of its higher refractive index. It is desirable that the particulates be as small as possible since they are less likely to promote open cell formation during foam processing. The particulates may take any discrete form such as particles, flakes, and the like.

Useful commercially-available treated titanium dioxide products include TiONA RCL-4, TiONA RCL-69, TiONA RCL-188 (SCM Chemicals), and Ti-Pure R-104 (E.I. DuPont de NeMours & Co.)

Titanium dioxide particulates are incorporated into the foam in an amount sufficient to reduce the thermal conductivity to less than that of a corresponding foam without the particulates. A corresponding foam is a foam of the similar polymer material composition and density. Typically, the particulates are present at from about 1 to about 20 percent by weight and preferably about 3 to about 10 percent by weight based upon the weight of the polymer material.

Another advantage to employing titanium dioxide particulates as an IAA is that it is possible to control the color of the foam product due to the natural white color of the titanium dioxide particulates. The white color can easily be re-colored or masked. This is not possible with some other IAAs carbon black and graphite, which result in a dark appearance which cannot easily be re-colored or masked.

Suitable plastic materials may be selected from any of those which can be blown into foam. The plastic material may be thermoplastic or thermoset. Suitable plastics include polyolefins, polyvinylchloride, alkenyl aromatic polymers, polycarbonates, polyetherimides, polyamides, polyesters, polyvinylidene chloride, polymethylmethacrylate, polyurethanes, polyisocyanurates, phenolics, copolymers and terpolymers of the foregoing, thermoplastic polymer blends, rubber modified polymers, and the like. Suitable polyolefins include polyethylene and polypropylene, and ethylene copolymers.

A preferred thermoplastic polymer foam comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred structures comprise substantially (i.e., greater than 95 percent) and most preferably entirely of polystyrene.

Extruded thermoplastic polymer foams are generally prepared by heating a thermoplastic material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level.

Extruded alkenyl aromatic polymer foams may be unimodal, bimodal, or multimodal in cell size distribution. A unimodal distribution is preferred. A unimodal cell size distribution is one in which the cells are of a generally uniform size throughout a foam, except for the skin regions. A bimodal cell size distribution is one in which there is one group of relatively larger primary foam cells of generally uniform size and another group of relatively smaller secondary foam cells of generally uniform size ranging in average cell size from about 5 percent to about 50 percent of the average cell size of the primary cells. A multimodal cell size distribution is one in which there are groups of a number of different cell sizes or a wide distribution of different cell sizes. Like in unimodal foams, the sizes and relative proportions of the primary and secondary cells in bimodal foams may vary at the skin regions. The secondary cells may be situated within the cell walls or struts of the primary cells, or may be situated outside of or adjacent to the primary cells individually or in groups of two or more. A strut is a juncture of three or more cell walls. The primary cells may be generally dispersed throughout the secondary cells such that the foam structure has a generally heterogeneous dispersion of the two cell types throughout. Teachings directed to foam structures with bimodal cell distributions and processes for making are seen in U.S. Pat. Nos. 4,455,272 and 4,559,367, and European Patent Application No. 89114160.8, which are incorporated herein by reference.

Useful foams containing treated titanium dioxide particulates may be formed by expansion of expandable beads containing a blowing agent. The beads may be molded at the time of expansion to form articles of various shapes. Processes for making pre-expanded beads and molded expanded bead foam articles are taught in *Plastic Foams, Part II*, Frisch and Saunders, pp. 544–585, Marcel Dekker, Inc. (1973) and *Plastic Materials*, Brydson, 5th ed., pp. 426–429, Butterworths (1989), which are incorporated herein by reference.

Treated titanium dioxide particulates may be incorporated into bead foam in several ways. The particulates may be incorporated during polymerization of expandable beads or may be incorporated into a melt of the polymer during preparation of the expandable beads.

Thermoset polymer foams such as polyurethane and polyisocyanurate foam structures may be prepared with treated titanium dioxide particulates according to the present invention.

Polyurethane and polyisocyanurate foams are usually made by reactive foaming of two preformulated components, commonly called the A-component and the B-component. The A-component is an isocyanate, and the B-component is an isocyanate or a polyol. The treated titanium dioxide particulates and the blowing agent may be dispersed in either the isocyanate or the polyol or both.

Suitable polyisocyanates include diisocyanates such as m-phenylene diisocyanate, toluene-2,4-diisocyanate, toluene-2,6-diisocyanate, mixtures of 2,4-and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4"-triphenylmethane-triisocyanate, polymethylenepolyphenyl isocyanate, toluene-2,4,6-triisocyanate; and the tetraisocyanates such as 4,4'-dimethyldiphenylmethane-2,2',5,5'-tetraisocyanate.

Suitable polyols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinitol; mannitol; sorbitol; formitol; a-methyl-glucoside; diethylene glycol; triethylene glycol; tetraethylene glycol and higher polyethylene glycols; dipropylene glycol and higher polypropylene glycols as well as dibutylene glycol and higher polybutylene glycols. Suitable polyols further include oxyalkylene glycols, such as diethylene glycol, dipropylene glycol, triethylene glycol, tripropylene glycol, tetraethylene glycol, tetrapropylene glycol, trimethylene glycol and tetramethylene glycol.

The polyurethane foams can be prepared by reacting the polyol and the isocyanate on a 0.7:1 to 1.1:1 equivalent basis. The polyisocyanurate foams of the invention are advantageously prepared by reacting the polyisocyanate with a minor amount of polyol to provide about 0.10 to 0.70 hydroxyl equivalents of polyol per equivalent of polyisocyanate. Useful polyurethanes and polyisocyanurates and processes for making them are seen in U.S. Pat. No. 4,795,763, which is incorporated herein by reference.

The selection of blowing agent is not critical to the present invention. Blowing agents useful in making the present foams include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

The amount of blowing agent employed to make the foams typically range from about 0.2 to about 5.0 gram-moles per kilogram of polymer, preferably from about 0.5 to about 3.0 gram-moles per kilogram of polymer, and most preferably from about 1.0 to 2.50 gram-moles per kilogram of polymer.

Various additives may be incorporated in the present foam structure such as inorganic fillers, pigments, antioxidants, acid scavengers, ultraviolet absorbers, flame retardants, processing aids, extrusion aids, and the like.

In addition, a nucleating agent may be added in order to control the size of foam cells. Preferred nucleating agents include inorganic substances such as calcium carbonate, talc, clay, silica, barium stearate, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

The foams have densities of from about 10 to about 150 and most preferably from about 10 to about 70 kilograms per cubic meter according to ASTM D-1622-88. The foam has an average cell size of about 5.0 millimeters or less and preferably from about 0.1 to about 1.5 millimeters according to ASTM D3576-77.

The present foams may take any physical configuration known in the art, such as sheet or plank. The present foam is particularly suited to be formed into a plank, desirably one having a cross-sectional area of 30 square centimeters (cm) or more and a minor dimension in cross-section of ⅜ inch (0.95 cm) or more.

The present foams have 85 percent or more, preferably 90 percent or more, and most preferably 95 percent or more closed cell content according to ASTM D2856-87.

The present foam may be used to insulate a surface by applying to the surface an insulating panel fashioned from the present structure. Such panels are useful in any conventional insulating applications such as roofing, buildings, refrigerators, etc.

The following are examples of the present invention, and are not to be construed as limiting. Unless otherwise indicated, all percentages, parts, or proportions are by weight.

EXAMPLES

Alkenyl aromatic polymer foams of the present invention containing treated titanium dioxide are made according to the process of the present invention.

Example 1 and Control Example 1

Alkenyl aromatic polymer foams containing titanium dioxide particulates were made using an apparatus comprising a 2½ inch (6.35 cm) extruder, a mixer, a cooler, and an extrusion die in series. Control foams without titanium dioxide particulates were also made using the apparatus.

The alkenyl aromatic polymer material comprised 90 percent by weight of a polystyrene resin of 132,000 weight average molecular weight and 10 percent by weight of a styrene/alphamethylstyrene copolymer having a weight average molecular weight of 4800. Weight average molecular weight was determined by size exclusion chromatography (SEC). The copolymer was a alphamethylstyrene monomer (Kristalex 5140 by Hercules). The titanium dioxide particulates were of the rutile crystal form (TiONA RCL-4 by SCM Chemicals). The particulates had an average particle size of 0.27 microns. Titanium dioxide was supplied in the form of a 50 percent concentrate with the polystyrene resin. The other additives were tetrasodiumpyrophosphate (0.2 parts per hundred (pph)), barium stearate (0.05 pph), linear low density polyethylene (0.5 pph), a blue pigment (0.01 pph), and hexabromocyclododecane (2.5 pph) based on the weight of the polymer material.

A blowing agent comprising carbon dioxide was fed to the mixer at 4.7 pph (parts per hundred) based upon the weight of the alkenyl aromatic polymer material.

The concentrate, additives, and resin were fed to the extruder and melted and mixed to form a polymer melt mixture. The melt mixture was conveyed to the mixer where blowing agent was injected into the melt mixture to form a polymer gel. The gel was conveyed through the die and expanded at atmospheric pressure to form the foam. The foaming temperature employed was 124° C. for Runs 1 and 2 and 125° C. for Run 3.

The resulting foams were characterized as Run 1 and Run 2 in Table 1. The foam physical properties are set forth in Table 1.

It was found possible to make good quality foams of relatively low open cell content. The foams containing titanium dioxide (examples) exhibited lower thermal conductivity than the control foam (Run 3) without it.

TABLE 1

| Run Number | Thickness and Width (inch (centimeter)) | Loading Level of Titanium Dioxide (pph) | Density without skin (pcf) | Vertical Cell Size (millimeters) | Open Cell Content (volume percent) | K-Factor[1] (BTU · in/ hr · ft² · °F.) |
|---|---|---|---|---|---|---|
| Run 1 | 1.0(2.54) × 7.3(18.54) | 5 | 2.49 | 0.28/ 0.25 | 4.0 | 0.2370 |
| Run 2 | 0.96(2.44) × 7.9(20.07) | 10 | 2.68 | 0.25/ 0.23 | 8.3 | 0.2365 |
| Run 3* | 1.0(2.54) × 7.8(19.81) | 0 | 2.49 | 0.36/ 0.34 | 3.4 | 0.2561 |

*Not an example of the present invention
[1]K-factor determined at 75° F. after 21 days Example 2 and Comparative Example 2

Alkenyl aromatic polymer foams containing titanium dioxide particulates were made using the apparatus of Example 1. Control foams without titanium dioxide particulates were also made using the apparatus.

The alkenyl aromatic polymer material was the polystyrene resin of Example 1. The titanium dioxide particulates were of the rutile crystal form (Ti-Pure R-101 by E. I. DuPont de NeMours & Co.). The mean particle size was 0.29 micrometers Titanium dioxide was supplied in the form of a 43 percent concentrate with the polystyrene resin. Other additives were the same as in Example 1.

A blowing agent comprising ethyl chloride and/or carbon dioxide was fed to the mixer at the levels indicated in Table 2.

The concentrate, additives, and resin were fed to the extruder and melted and mixed to form a polymer melt mixture. The melt mixture was conveyed to the mixer where blowing agent was injected into the melt mixture to form a polymer gel. The gel was conveyed through the die and expanded at atmospheric pressure to form the foam. The foaming temperature employed was 115° C. for Run 1 and 125° C. for Run 2.

The example foam was characterized as Run 1 and the control foam as Run 2 (control) in Table 2.

It was found possible to make good quality foams of low open cell content. The foam containing titanium dioxide (example) exhibited lower thermal conductivity and open cell content than the control foam without it.

What is claimed is:

1. A process for making an extruded thermoplastic polymer foam, comprising:
   a) heating a thermoplastic polymer material to form a melt polymer material;
   b) incorporating into the melt polymer material about 1 to about 20 weight percent of titanium dioxide particulates based upon the weight of the polymer wherein the particulates have a wetting agent applied to a substantial portion of their surfaces;
   c) further incorporating into the melt polymer material at an elevated pressure a blowing agent to form a foamable gel;
   d) cooling the foamable gel to an optimum foaming temperature; and
   e) extruding the foamable gel through a die to a region of lower pressure to form the foam.

2. The process of claim 1, wherein the foam comprises from about 3 to about 10 weight percent titanium dioxide based upon the weight of the polymer.

3. The process of claim 1, wherein the wetting agent comprises from about 0.05 to about 2.0 weight percent based upon the weight of the titanium dioxide.

4. The process of claim 1, wherein the wetting agent comprises from about 0.1 to about 1.0 weight percent based upon the weight of the titanium dioxide.

5. The process of claim 1, wherein the wetting agent comprises a phosphorylated polyene having a chain length of ten carbon atoms or more.

6. The process of claim 1, wherein the foam is an alkenyl aromatic polymer foam having greater than 50 percent by weight of alkenyl aromatic monomeric units.

7. The process of claim 6, wherein the foam is a polystyrene foam.

8. The process of claim 1, wherein the foam is a polyisocyanurate foam.

9. The process of claim 1, wherein the foam is a polyurethane foam.

10. The process of claim 1, wherein the foam is a polyethylene foam.

11. The process of claim 1, wherein the foam comprises from about 3 to about 10 weight percent titanium dioxide based upon the weight of the polymer, the wetting agent comprising from about 0.05 to about 2.0 weight percent based upon the weight of the titanium dioxide.

12. The process of claim 11, wherein the foam is a polystyrene foam.

TABLE 2

| Run Number | Thickness and Width (inch(centimeter)) | TiO₂ Loading Level (pph) | Foaming Temperature (°C.) | Blowing Agent Loading Level (pph) | Density Without Skin (pcf) | Vertical Cell Size (millimeter) | Open Cell Content (volume percent) | K-Factor[1] (BTU · in/ hr · ft² · °F.) |
|---|---|---|---|---|---|---|---|---|
| Run 1 | 0.89(2.26) × 10.25(26.04) | 10 | 115 | CO₂(1.5) EtCl(7.9) | 2.43 | 0.25 | 2.5 | 0.2392 |
| Run 2* | 0.98(2.49) × 8.0(20.32) | 0 | 125 | CO₂(4.7) | 2.51 | 0.29 | 3.2 | 0.2457 |

*Not an example of the present invention
[1]K-factor determined at 75° F. after 90 days While embodiments of the foam and the process of the present invention have been shown with regard to specific details, it will be appreciated that depending upon the manufacturing process and the manufacturer's desires, the present invention may be modified by various changes while still being fairly within the scope of the novel teachings and principles herein set forth.

13. The process of claim 11, wherein the foam is a polyisocyanurate foam.

14. The process of claim 11, wherein the wetting agent comprises a phosphorylated polyene having a chain length of ten carbon atoms or more.

15. The process of claim 1, wherein the wetting agent is selected from the group consisting of fatty acids, ethoxylated fatty acids, fatty acids esters of 8–24 carbon atoms, phthallic esters of 8–24 carbon atoms, sorbitan esters, monoglycerides, mineral oils, silicon oils, polyalkylene glycols such as polyethylene glycol and polypropylene glycol, and mixtures of the foregoing.

16. The process of claim 11, wherein the wetting agent is selected from the group consisting of fatty acids, ethoxylated fatty acids, fatty acids esters of 8–24 carbon atoms, phthallic esters of 8–24 carbon atoms, sorbitan esters, monoglycerides, mineral oils, silicon oils, polyalkylene glycols such as polyethylene glycol and polypropylene glycol, and mixtures of the foregoing.

17. A process for making a thermoset polymer foam, comprising:
   a) providing a first thermoset monomer;
   b) providing a second thermoset monomer the same or different than the first monomer and polymerizable with the first monomer;
   c) incorporating into either or both the first and second monomers about 1 to about 20 weight percent of treated titanium dioxide particulates based upon the weight of the polymer wherein the particulates have a wetting agent applied to a substantial portion of their surfaces;
   d) incorporating into either or both the first and second monomers a blowing agent; and
   e) mixing the first and second monomers under polymerizing conditions to form the thermoset polymer foam.

18. The process of claim 17, wherein the foam comprises from about 3 to about 10 weight percent titanium dioxide based upon the weight of the polymer.

19. A process for making expandable thermoplastic foam beads, comprising:
   a) providing a first thermoplastic monomer;
   b) providing a second thermoplastic monomer the same or different than the first monomer and polymerizable with the first monomer;
   c) polymerizing the first and second monomers to form thermoplastic particles;
   d) incorporating during polymerization about 1 to about 20 weight percent of treated titanium dioxide particulates based upon the weight of the polymer wherein the particulates have a wetting agent applied to a substantial portion of their surfaces;
   e) incorporating a blowing agent into the thermoplastic particles during or after polymerization; and
   f) cooling the thermoplastic particles to form the expandable foam beads.

20. The process of claim 19, wherein the foam comprises from about 3 to about 10 weight percent titanium dioxide based upon the weight of the polymer.

21. The process of claim 19, wherein the foam is a polystyrene foam.

22. A process for making expandable thermoplastic foam beads, comprising:
   a) heating a thermoplastic polymer material to form a melt polymer material;
   b) incorporating into the melt polymer material about 1 to about 20 weight percent of treated titanium dioxide particulates based upon the weight of the polymer wherein the particulates have a wetting agent applied to a substantial portion of their surfaces;
   c) further incorporating into the melt polymer material at an elevated temperature a blowing agent to form a foamable gel;
   d) cooling the foamable gel to form an essentially continuous expandable thermoplastic strand; and
   e) pelletizing the expandable thermoplastic strand to form expandable thermoplastic foam beads.

23. The process of claim 22, wherein the foam comprises from about 3 to about 10 weight percent titanium dioxide based upon the weight of the polymer.

24. The process of claim 22, wherein the foam is a polystyrene foam.

* * * * *